United States Patent
Klemm

(10) Patent No.: US 12,314,293 B2
(45) Date of Patent: May 27, 2025

(54) INFORMATION SYSTEM AND ELECTRONIC DEVICE

(71) Applicant: Sanofi, Paris (FR)

(72) Inventor: Thomas Klemm, Frankfurt am Main (DE)

(73) Assignee: Sanofi, Paris (FR)

( * ) Notice: Subject to any disclaimer, the term of this patent is extended or adjusted under 35 U.S.C. 154(b) by 260 days.

(21) Appl. No.: 17/925,217

(22) PCT Filed: May 14, 2021

(86) PCT No.: PCT/EP2021/062799
§ 371 (c)(1),
(2) Date: Nov. 14, 2022

(87) PCT Pub. No.: WO2021/229043
PCT Pub. Date: Nov. 18, 2021

(65) Prior Publication Data
US 2023/0229681 A1   Jul. 20, 2023

(30) Foreign Application Priority Data

May 15, 2020   (EP) ..................... 20315240

(51) Int. Cl.
*G06F 16/3329*   (2025.01)
*G06F 16/3332*   (2025.01)

(52) U.S. Cl.
CPC ...... *G06F 16/3329* (2019.01); *G06F 16/3334* (2019.01)

(58) Field of Classification Search
CPC ............. G06F 16/3329; G06F 16/3334; G06F 16/90332; G06F 16/33; H04L 67/63
See application file for complete search history.

(56) References Cited

U.S. PATENT DOCUMENTS

| 2014/0330511 A1 | 11/2014 | Tison et al. |
| 2018/0191808 A1 * | 7/2018 | Bhaya ..................... H04L 67/10 |

FOREIGN PATENT DOCUMENTS

| CN | 107704569 A | 2/2018 |
| CN | 108986790 A | 12/2018 |
| EP | 2752846 A1 | 7/2014 |

(Continued)

OTHER PUBLICATIONS

International Search Report and Written Opinion for Application No. PCT/EP2021/062799, dated Jul. 13, 2021, 10 pages.

(Continued)

*Primary Examiner* — Yogeshkumar Patel
(74) *Attorney, Agent, or Firm* — McCarter & English, LLP

(57) ABSTRACT

The present disclosure relates to an information system, a method of providing information, and a respective electronic device. The electronic device is operable to provide an information to a user being indicative of a user device. The electronic device comprises: a processor to process a user request, a user interface to communicate with the user, and an electronic storage connected to the processor. The processor is operable: to extract at least one keyword from the user request, to select at least one information content from a content database on the basis of the at least one extracted keyword, and to provide the at least one selected information content to the user via the user interface.

17 Claims, 5 Drawing Sheets

(56) References Cited

FOREIGN PATENT DOCUMENTS

| JP | 2019-506759 A | | 3/2019 | |
|---|---|---|---|---|
| KR | 20190086126 A | * | 7/2019 | ........... G06F 16/334 |
| WO | 2018/125299 A1 | | 7/2018 | |

OTHER PUBLICATIONS

European Office Action for Application No. 21724706.3, dated Jan. 18, 2024, 6 pages.
Japanese Office Action for Application No. 2022-569037, dated Mar. 18, 2025, 12 pages with English Translation.

* cited by examiner

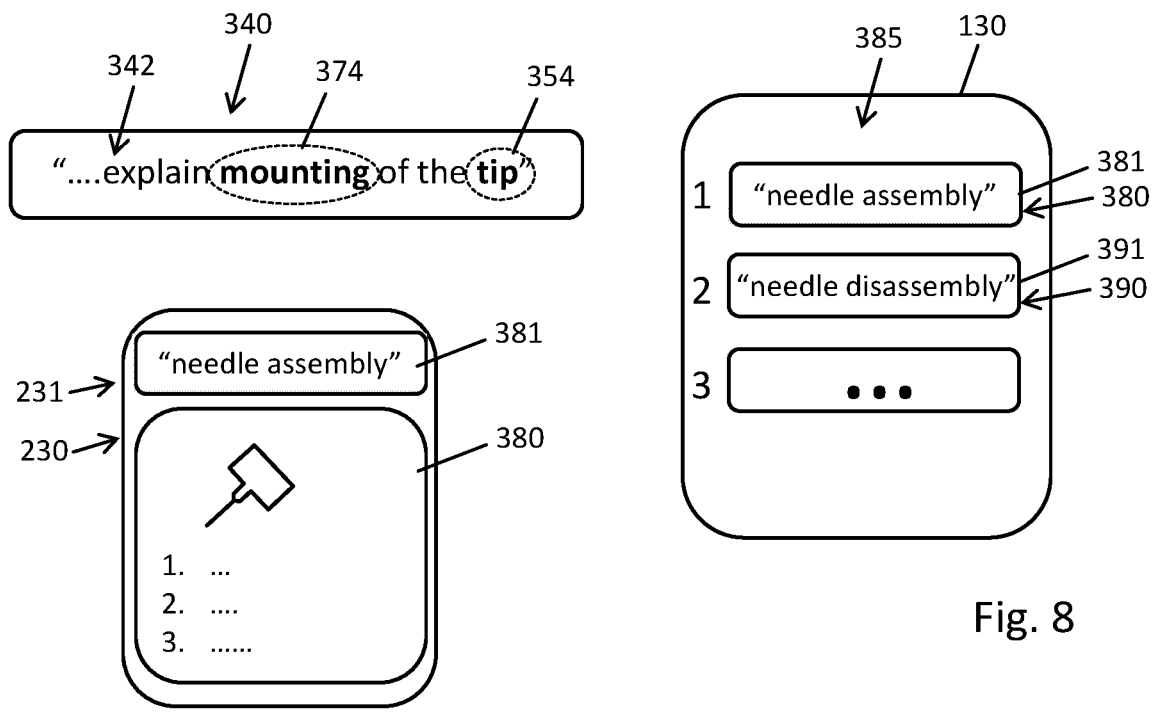
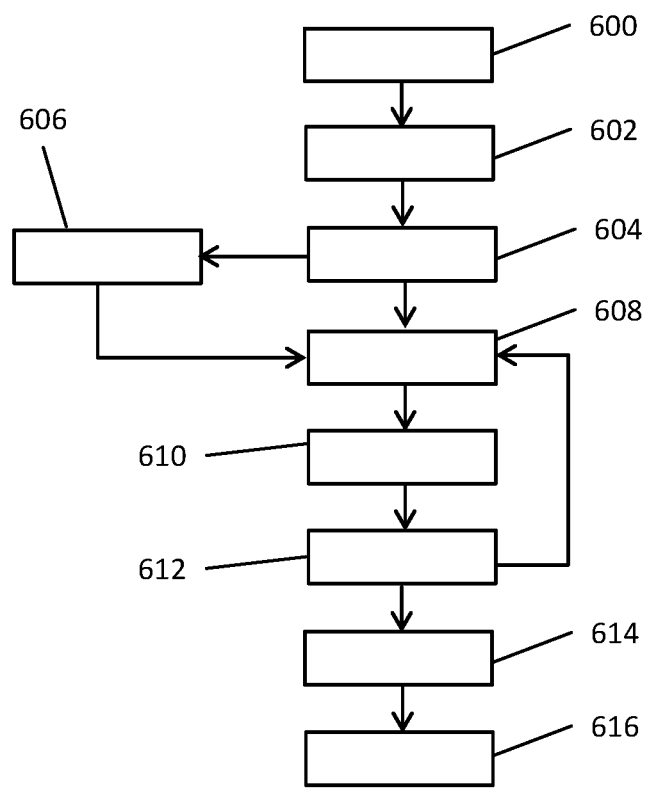
Fig. 8
Fig. 9

INFORMATION SYSTEM AND ELECTRONIC DEVICE

CROSS-REFERENCE TO RELATED APPLICATIONS

This application is a 35 U.S.C. § 371 national stage filing of International Application No. PCT/EP2021/062799 filed on May 14, 2021, which in turn claims priority to European Patent Application No. 20315240.0, filed May 15, 2020. The entire contents of each of the foregoing applications are included herein by reference in their entirety.

DESCRIPTION

Field

The present disclosure relates to the field of information systems, in particular to the field of user specific or device specific information systems. In one aspect the present disclosure relates to an electronic device for providing an information to a user, wherein the information is indicative of a user device. In still another aspect the disclosure relates to a method of providing information to a user as well as to a non-transitory computer readable storage medium configured to provide user specific or device specific information to a user.

Background

User devices, e.g. manually operated devices or electronic devices to be used by an individual or by a group of persons are typically provided with a user manual. With some user devices and depending on the complexity of the user device printed user manuals may nowadays no longer satisfy the individual requirements and needs of the respective user. A printed and rather static user manual might be somewhat disadvantageous for a large group of users having different skills or experience with the particular user device. For experienced users, i.e. users having already experience with a particular user device, a printed user manual may contain a rather large amount of superfluous information. With unexperienced users, a printed user manual may not provide enough information.

When a printed user manual is attached to or enclosed in a packaging of a user device the printed manual requires quite a lot of packaging space. Moreover, when a user device is distributed in numerous countries the user manual may be multilingual, which leads to a further increase of the size and weight of the printed user manual. A rather large and multilingual printed user manual may form a rather large barrier for the user to read the user manual in its entirety.

Generally, user manuals may be also provided in an electronic format, e.g. as an electronic document. Even though such electronic documents may generally offer a functionality to search for certain topics and terms, a user looking for instructions to a particular use or functionality of the user device may not be familiar with such topics and term as they are used in the user manual.

OBJECTS

It is therefore desirable to provide an improved information system for providing information to a user, wherein the information is indicative of a user device. It is a demand to provide an information system configured to offer user device-specific information to the user on the user's demand. Moreover, it is desirable to provide an improved electronic device particularly configured to provide an information to a user, wherein the information is indicative of a user device. It is a further aim to provide a respective method of providing information to a user and to provide a computer program executable by a processor of an electronic device in order to provide the requested information to the user.

The system, the electronic device, the method and the computer program should be adaptable to a large variety of user requests, in particular in situations, where a user is not familiar with definitions or technical terms used in connection with the user device.

SUMMARY

In one aspect there is provided an electronic device. The electronic device is configured to provide an information to a user, wherein the information is indicative of a user device. Typically, the electronic device and the user device are different devices. With some examples the electronic device and the user device may coincide. The electronic device typically comprises a processor configured to process a user request. The electronic device further comprises a user interface to communicate with the user. The electronic device further comprises an electronic storage connected to the processor. The processor of the electronic device is operable to extract at least one keyword from a user request, typically received via the user interface. The processor is further operable to select at least one information content from a content database on the basis of the at least one extracted keyword. Moreover, the processor is operable to provide the at least one selected information content to the user via the user interface.

Since the processor is operable to extract at least one keyword from a user request the electronic device becomes operable to process almost arbitrary user requests that do no longer have to contain a particular technical term or particular definition related to the user device. Moreover, by extracting at least one keyword from a user request the user is given the possibility to pose a question as a user request, e.g. by making use of a natural language command. The question may not only contain a keyword but may also contain natural language and certain verbs or adjectives, which in combination with a noun may be semantically understood by the processor.

The ability to extract at least one keyword from the user request for the selection of at least one information content from a content database on the basis of the at least one extracted keyword provides a rather intuitive approach to provide a user with well-defined, precise and user specific information on demand. In this way, only relevant information having a best-match with the at least one extracted keyword or with the original user request may be provided to the user. Superfluous information can be filtered and suppressed.

In this way, only a reduced and relevant amount of information of a flood of information contained in the content database can be provided to the user upon the user's request. With some examples the content database is provided by the electronic storage of the electronic device. With other embodiments, the content database is located remote but is accessible via a communication interface of the electronic device.

With some examples extraction of the keyword from the user request may be conducted standalone by the processor of the electronic device. With other examples extraction of the at least one keyword from the user request is provided remote, e.g. by at least one of a user device service provider or an electronic device service provider. For this, the electronic device may be equipped with a communication interface to transmit the user request to at least one of the user device service provider and the electronic device service provider.

Similarly, also the selection of the at least one information content from the content database may be either conducted standalone by the processor of the electronic device. With other examples or embodiments the selection of the at least one information content from the content database is provided by at least one of the user device service provider and the electronic device service provider. The selected information content or at least a link and/or an indicator pointing to the selected information content may be provided by the processor of the electronic device itself.

With other examples the at least one selected information content may be provided by at least one of the user device service provider and the electronic device service provider to the electronic device. The selected information content as provided by at least one of the user device service provider and the electronic device service provider may be at least temporally stored in the electronic storage of the electronic device. Then, the processor may provide the respective information content to the user via the user interface.

The present disclosure covers numerous examples and embodiments, starting from a standalone electronic device configured to provide a complete processing of the user request, extraction of the at least one keyword from the user request, selection of at least one information content from a content database provided by the electronic storage and providing of the at least one selected information content to the user via the user interface.

With other examples the electronic device is embedded in an information system, e.g. a distributed information system configured to provide information to a user, wherein the information is indicative of a particular user device. Here, the electronic device typically comprises a communication interface configured to communicate with at least one of a user device service provider and an electronic device service provider. At least one of the keyword extraction, the information content selection and/or the providing of at least one selected information content to the user may be provided, processed or at least supported by at least one of the user device service provider and the electronic device service provider.

With such embodiments or examples, the data processing capability of the electronic device may be quite low. With rather low demands in terms of data processing and/or storage capabilities the electronic device may be implemented at low or moderate costs. Moreover, the hardware demands for the electronic device may be comparatively low. The electronic device may be based on available hardware components provided with a software or with a computer program operable to provide at least one of the following: processing of a user request, extracting at least one keyword from the user request, selecting at least one information content from the content database on the basis of the at least one extracted keyword and providing the at least one selected information content to the user via the user interface.

According to a further example the processor is operable to execute a virtual assistant application for processing of the user request. A virtual assistant application may be configured to process natural language contained in the user request. In this way, the user request may comprise or may consist of a language command, e.g. a natural language command. The user request is by no way limited to natural language commands. The user request may comprise numerous other commands, such as text or haptic commands entering the user interface by mechanical interaction with the user of the electronic device.

When the electronic device is absent of a communication interface, the virtual assistant application is executed standalone on the electronic device. Typically, the electronic device is implemented or configured as a portable and/or wearable electronic device. The electronic device may comprise one of a smart phone, a smart watch, a tablet computer, a desktop computer or a laptop computer. When implemented as a standalone device the electronic device may be void of a communication interface. Here, all information, in particular the content database may be stored locally in the electronic storage of the electronic device.

With a further example the electronic device comprises a communication interface. Here, the processor is operable to submit the user request to at least one of a user device service provider and an electronic device service provider via the communication interface. The processor and/or the communication interface are further configured to receive a preprocessed user request in return. The preprocessed user request is provided by at least one of the user device service provider and the electronic device service provider. The preprocessed user request may contain a keyword extracted from the user request. With some examples the preprocessed user request may contain at least one or several selected information contents from the content database that has or have been selected on the basis of the at least one extracted keyword.

The computational power to extract at least one keyword from the user request may be hence provided by at least one of the user device service provider and the electronic device service provider. In this way, a user request can be processed in a rather efficient way. Computational power of the processor of the electronic device as well as electric energy consumption of the electronic device for processing of the user request can be kept at a rather low level without any perceptible drawbacks in terms of processing quality.

When the electronic device is provided with a communication interface to communicate with at least one of a user device service provider and an electronic device service provider it is generally conceivable that the electronic device belongs to a rather large and distributed information system for providing information to a large variety of uses, wherein each user utilizes an electronic device. In this way, statistics of user requests may be established and may be further used to provide preprocessed user requests in return. Moreover, a content database hosted by at least one of the user device service provider and the electronic device service provider may be constantly updated or improved on the basis of statistics derived from numerous user requests.

In the context of the present disclosure a user device service provider is entitled and enabled to provide service or information related to the user device. Typically, the user device service provider provides user device specific information to the information system as/or to the electronic device that is actually used by the user to gather or to obtain user device specific information. Here and with some examples the user device may be implemented as a medical device, e.g. as a drug delivery device. The drug delivery device may be provided with a medicament or drug. The medicament or drug may be pre-assembled inside the drug delivery device. Hence, the drug delivery device may be a prefilled drug delivery device. The user device service provider might be a manufacturer of the medical device and/or a pharmaceutical manufacturer of the drug or medicament.

In the present context an electronic device service provider is configured to expand the functionality of the electronic device the user is actually using to gather or to obtain user device specific information. Typically, the electronic device service provider is configured to provide a virtual assistant configured to communicate with the virtual assistant application of the electronic device. The electronic device service provider may be configured to process or to preprocess a language command received or captured by the communication interface of the electronic device. Hence, the electronic device service provider may provide a functional expansion of the virtual assistant application executed by the processor of the electronic device. The electronic device service provider may provide extended functionality of the electronic device for an appropriate processing of the user request.

With some examples, the communication between the electronic device and the electronic device service provider is configured to process a user request provided as natural language, command. With some examples, the electronic device may record a natural language command and may transmit the natural language command to the electronic device service provider via the communication interface. The electronic device service provider may then process the natural language command into a text string and may return the respective text string as a preprocessed user request to the electronic device.

The text string received as a preprocessed user request may be then further processed by the processor of the electronic device and/or by the user device service provider. For instance, a preprocessed text string returned from the electronic device service provider may contain one or several keywords. For a final extraction of the at least one or several keywords from the preprocessed user request, i.e. from the text string as provided by the electronic device service provider the processor of the electronic device may further communicate with the user device service provider. For this, the user device service provider may be provided with a user device specific content database particularly adapted to process and/or to recognize dedicated user device-specific user requests.

Typically, the vocabulary or the technical terms and definitions used for a particular user device are too specific to be correctly understood and/or to be correctly interpreted by an electronic device service provider. Here, the communication between the electronic device and the user device service provider may help to correctly understand and/or to correctly interpret the original user request in terms of the well-defined technical terms, definitions and/or user device-specific functions.

With some examples, the processor of the electronic device is configured to communicate simultaneously and/or sequentially with both, the electronic device service provider and the user device service provider. At a first step and upon receipt of a user request by the user interface the electronic device may be configured to communicate with the electronic device service provider, e.g. in order to transfer a language command into a text string. Upon receipt of a preprocessed user request from the electronic device service provider the processor of the electronic device may be further configured to process the preprocessed user request with the help of the user device service provider. Alternatively, the processor of the electronic device is configured to submit the preprocessed user request to the user device service provider. In either way and by making use of the computational power of the user device service provider relevant information content, e.g. hosted in a content database of the user device service provider, can be at least selected and/or provided to the user via the user interface.

It is even conceivable, that the processor of the electronic device is configured to process a user request iteratively. In a first step, a user request may be transmitted to the electronic device service provider. A response received from the electronic device service provider may be then transmitted to the user device service provider. A response from the user device service provider may be again transmitted to the electronic device service provider and so on.

In either way, the communication between the electronic device and at least one of the electronic device service provider and the user device service provider is beneficial to correctly interpret the user request, to extract at least one keyword from the user request, to select at least one information content from a content database on the basis of the at least one extracted keyword and/or to provide the at least one selected information content to the user.

With another example the processor is operable to assign the at least one extracted keyword from at least one of the user request and the preprocessed user request to a keyword group. The keyword group contains numerous keywords. The processor of the electronic device is further operable to select the at least one information content on the basis of the keyword group assigned to the extracted keyword. In this way, numerous synonyms that may be frequently used for one and the same aspect, technical term or definition in relation to the user device may be grouped together in a keyword group.

In this way, recognizing of only one keyword of a keyword group is indicative of the entire keyword group. Grouping together of numerous keywords in a keyword group may equally apply to concrete objects or features of the user device as well as to numerous actions. Typically, technical or specific terms used for one and the same fact, object of feature may be grouped together in a keyword group. In the same way similar or like actions as well as synonyms for similar or equal actions to be conducted in relation or with the user device may be grouped together in a keyword group. In this way the entire system and electronic device can be provided with an increased robustness in terms of diversity of different user requests.

With some examples and in particular when the electronic device is equipped with a communication interface assignment of the at least one extracted keyword to a keyword group may be provided by at least one of the electronic device service provider and the user device service provider. In this way, the assignment of at least one extracted keyword to a keyword group may be conducted on the basis of a statistical analysis of a large amount of user requests all being processed by at least one of the electronic device service provider and the user device service provider. In this way the assignment of a keyword to a keyword group may be subject to dynamic adaptation and may be subject to a permanent self-learning algorithm. This way, a matching of the at least one extracted keyword with the original user request can be constantly improved. This may also help to improve the precision of selection of the at least one information content from the content database.

According to another example the processor is operable to assign at least a first extracted keyword to a first keyword group and to assign at least a second extracted keyword to a second keyword group. Moreover, the processor is operable to select the at least one information content on the basis of the first keyword group and on the basis of the second keyword group. In this way, a multidimensional election or selection of the at least one information content can be provided. Election of the information content may be conducted on the basis of at least a first and a second keyword group. The selection is by no way limited to only two keyword groups. It may be expanded to n-keyword groups, with n being an integer larger than or equal 3.

A combination of extracted keywords may be more precise than only one keyword for selecting the at least one information content from a content database. Generally, the more keywords can be extracted from a user request, the more precise a selection of the at least one information content will be.

According to another example the processor is operable to preselect at least a first information content and a second information content from the content database on the basis of the at least one extracted keyword. The processor is further operable to provide a content selection offer to the user. The content selection offer may contain a first information content identifier and a second information content identifier. The first information content identifier is indicative of the first information content. The second information content identifier differs from the first information content identifier. The second information content identifier is indicative of the second information content. In this way the electronic device is operable to provide a content selection offer to the user containing at least a first and a second information content identifier. The user may then select at least one of the first and second information content identifier in order to finally select at least one information content. Upon selection of one of the at least first and second information content identifiers through the user the electronic device is operable to provide the respective first and/or second information content in response.

Providing of the content selection offer gives the user of the electronic device the possibility to manually select or to manually choose an appropriate information content indicated by the respective information content identifier. Instead of the processor being operable to preselect at least a first information content and a second information content the respective functionality may be also provided by at least one of the electronic device service provider and the user device service provider. In this way, a respective preselection and/or providing of a content selection offer may be equally provided by the electronic device service provider and the user device service provider. In this way, computational power or demands for the processor of the electronic device can be further reduced.

Moreover, preselection of first and second information contents and providing of the content selection offer may be subject to dynamic adaptation, e.g. taking into account statistical analysis of previous user requests or user selections.

According to another example the processor of the electronic device is configured to provide at least one of the first information content and the second information content in response to the user selecting one of the first information content identifier and the second information content identifier of the content selection offer via the user interface. For instance, the user when provided with the content selection offer may select the first information content identifier. Selection of the first content identifier through the user invokes providing of the respective first information content to the user via the user interface. The content selection offer may be provided by the user interface. Selection of one of the first information content identifier and the second information content identifier may be provided and/or supported by the user interface as well.

According to a further example the user interface of the electronic device comprises at least one of a display, a camera, a speaker, a microphone and a key or button and combinations thereof. With some examples the display is a touch sensitive display. The display comprises a two-dimensional display screen, typically configured to provide at least one of a content selection offer and/or a selected information content. The camera and/or the microphone may be used as an input to process a user request. In a similar way also a key or button as well as a touch sensitive area of the display may be used to gather and/or to record or to capture as user input.

The display and/or the speaker may be used to provide the at least one selected information content to the user. The speaker may provide an audible information content. The display may provide visual information content. With some examples, the speaker and the display may concurrently provide a dynamic, hence a combined visual and acoustic output. The user interface may be configured to provide a video stream containing moving images and sound.

When the display is implemented as a touch sensitive display it may comprise or provide numerous keys, such as a virtual keyboard allowing to enter numerous search strings or the like command.

With some examples or embodiments the electronic device is provided with an automatic user device recognition functionality. For this, the electronic device comprises a sensor to identify the user device. For this, the user device is equipped with a unique identifier being indicative of the user device. The identifier may comprise a unique indicator detectable by the electronic device. The identifier of the user device may comprise at least one of a mechanical code, an electronic code, a magnetic code and a visual code. The electronic device is equipped and provided with a corresponding code reader so as to identify the respective code or identifier of the electronic device. The code reader may be implemented or embedded in the user interface.

According to a further example at least one of the electronic device itself and its processor is or are configured to embed the identifier of the user device into the user request. Embedding of the identifier into the user request provides a direct assignment of the user requests to the user device. In this way, the user request can be logically mapped and/or assigned to a particular user device. In this way, the user request initiated by the user of the electronic device can be automatically transferred into a user device specific user request.

In this way and for obtaining information being indicative of a user device the user does not have to provide device related or device specific supplemental information manually when initiating the user request, e.g. via the user interface.

Rather, the electronic device or its processor may be operable to automatically capture and/or to process the identifier of the user device and to embed the identifier into the user request. In this way it can be ensured, that only information related to the user device as identified by the identifier will be selected from a content database and/or provided to the user in response to the user request. When the user device is a medical device this may increase patient safety. Here, it can be effectively prevented, that a user erroneously requests information of another device that differs from the user device the user is actually using.

When received by at least one of the processor of the user device, the user device service provide, the electronic device service provider and the content provider, the identifier is extractable from the user request so that the at least one of the processor, the user device service provider, the electronic device service provider and the content provider can provide information particularly related to the user device identified by the identifier. On the basis of the identifier extracted from the user request at least one of the processor, the user device service provider, the electronic device service provider and the content provider may conduct a preselection of an information content. Hence, if the identifier is indicative of a user device of type A, information content hosted or provided by at least one of the user device service provider and the electronic device service provider not related to user devices of type A can be excluded and disregarded.

Moreover, on the basis of the identifier and the associated device recognition functionality accessibility to particular information only relating to the identified user device may be granted. Here, it is conceivable, that information related to a particular user device, e.g. of type A, should remain generally unavailable to users making use of other types of user devices, e.g. of user devices of type B. Thus, at least one of the processor of the electronic device, the electronic device service provider and the user device service provider, will be operable to prevent readout or providing of an information content related to a user device of type A unless the user request comprises a unique identifier of the user device of type A.

Readout of an information content and/or providing of an information content related to a user device of type A requires that the user request comprises an identifier being indicative of the user device of type A. Readout or providing of information content related to a user device of type A will be effectively blocked and/or prevented for user requests comprising an identifier non-matching with an identifier of the user device of type A. In this way, the identifier of the user device can be used to authorize extraction and/or providing of an information content to the user.

According to another example the processor is operable to process the user request containing a language command and to extract the at least one keyword from the language command. With other examples the processor is operable to transmit the language command to at least one of the electronic device service provider and the user device service provider and to receive a correspondingly preprocessed user request in response. In this way, the natural language processing capability does not have to be provided by the electronic device itself but may be provided through communication and/or data exchange with the electronic device service provider and/or the user device service provider via the communication interface.

The electronic device may be configured to process a language command as a user request and to return a visual information content to the user via the user interface. Hence, the user interface may comprise a combination of a display, a camera, a speaker and a microphone.

According to another aspect the disclosure relates to an information system for providing information to a user. The information being indicative of a user device. The information may cover properties, functions, features as well as instructions of use of the user device. The information system may provide a kind of a virtual user manual for a user of the user device. The information system comprises an electronic device comprising a processor, an electronic storage, a user interface and a communication interface. The processor is operable to process a user request received via the user interface of the electronic device. The information system further comprises at least one of a user device service provider and an electronic device service provider.

The respective service provider is configured to preprocess the user request received from the user interface. Typically, the user request is transmitted via the communication interface to at least one of the user device service provider and the electronic device service provider. The respective service provider is configured to return the preprocessed user request to the electronic device. Typically, the processor of the electronic device is operable to extract at least one keyword from at least one of the user request and the preprocessed user request and to select at least one information content from a content database on the basis of the at least one extracted keyword. Finally, the processor is operable to provide the at least one selected information content to the user via the user interface.

With some examples the content database is hosted and/or provided by at least one of the user device service provider and the electronic device service provider. With other examples the content database is stored locally in the electronic storage of the electronic device. The electronic device may be implemented as a portable or wearable electronic device. The electronic device may comprise e.g. a smart phone, a smart watch, a tablet computer or a laptop computer. The communication interface of the electronic device is typically implemented as a wireless communication interface. It may operate in a wireless network environment for exchanging data with at least one of the user device service provider and the electronic device service provider via a communication network.

The communication with at least one of the user device service provider and the electronic device service provider is of particular help to process the user request and to extract at least one keyword from the user request. The communication between the electronic device and at least one of the user device service provider and the electronic device service provider further enables to process different types and kinds of user requests. In this way, a user request in form of natural language, and as well as a user request in form of a search string or text string can be equally processed.

With an alternative example extraction of at least one keyword from at least one of the user request and the preprocessed user request may not be conducted by the processor of the electronic device but may be provided by at least one of the user device service provider and the electronic device service provider. In this way, at least one of the user device service provider and the electronic device service provider may be configured to process the user request and to return an extracted keyword to the electronic device and/or to preselect at least one of the information content from a content database.

Here, it is even conceivable that at least one of the user device service provider and the electronic device service provider does not only extract the at least one keyword but also provides preselection of at least one information content from the content database on the basis of the at least one extracted keyword. Furthermore, the respective service provider may be further configured to provide the at least one selected information content to the user via the communication interface and the user interface of the electronic device.

Typically, the information system is particularly configured to make use of an electronic device as described above. Insofar, all features, effects and benefits as described above in connection with the electronic device equally apply to the information system; and vice versa.

According to a further example the content database is hosted by the user device service provider. The user device service provider is further configured to transfer at least a portion of the content database to the electronic device in response to the user request. Here, and by way of processing or pre-processing of the user request the user device service provider may preselect at least a portion of the content database and may transfer or submit the relevant portion of the content database to the electronic device via the communication interface of the electronic device. Typically, the portion of the content database comprises or includes at least a first and a second information content. With further examples, the portion of the content database comprises at least 10%, at least 20%, at least 30%, at least 40% or at least 50% of the content database. The electronic device and the user device service provider may constantly or regularly exchange data via a communication link as provided by a communication network.

In this way, the electronic device can be provided with a user request-specific information content. The portion of the content database transmitted to the electronic device in response to the user request may be at least temporarily or even permanently stored in the electronic storage of the electronic device. In this way the electronic device can be provided with actual data or information from the content database on demand or on the basis of predefined regular time intervals. In this way and as the content database of the user device service provider is subject to frequent updates, respective updated information can be provided to the electronic device in the course of a user request or in accordance to an update schedule.

Moreover and with further examples, transmitting of at least a portion of the content database from the user device service provider to the electronic device may be triggered by the user device service provider. In this way, updates of the content database may be automatically distributed to the respective electronic device.

According to a further example the electronic device service provider is operable to preprocess a user request containing a language command. The electronic service provider is further operable to provide a preprocessed user request containing a text string corresponding to the language command. The preprocessed user request is typically transmitted to the electronic device in response to the electronic device submitting a user request to the electronic device service provider, e.g. via the communication interface.

The electronic device service provider and the user device service provider may be different providers. With some examples, the user device service provider and the electronic device service provider may be one and the same service provider.

With typical examples, the electronic device service provider is particularly configured to provide supplemental service or to provide extended functions of the electronic device. Typically, the electronic device service provider is configured to provide a virtual assistant for a user of the electronic device. The user device does not have to be an electronic device. The user device may comprise a personal user device configured for personal use by one or several persons. With some examples the user device is a medical device. The medical device may comprise at least one of a drug delivery device, an injection device, a pen-type injector, and or to inject Oracle an inhaler, a transfusion device or infusion device. The medical device may further comprise an infusion pump. When implemented as a drug delivery device the user device may be prefilled with a drug or medicament.

According to another aspect the present disclosure relates to a method of providing information to a user. The information being indicative of a user device. The method comprises the step of receiving a user request by an electronic device. The method further comprises the step of processing and/or preprocessing of the user request. The method further comprises the step of extracting at least one keyword from the user request or preprocessed user request. The method further comprises electing at least one information content from a content database on the basis of the at least one extracted keyword and providing at least one selected information contents to the user by a user interface of the electronic device.

Typically, the method of providing information to a user is implementable by an information system and/or by an electronic device as described above. Insofar all features, properties, effects and benefits as described above in connection with the electronic device and/or with the information system equally apply to the method of providing information to a user; and vice versa.

With some examples the method includes processing of a user request containing a language command. For processing of the language command the method provides transmitting of the language command as recorded by a microphone of the electronic device to an electronic device service provider. Upon receipt of the user request, i.e. the language command, the electronic device service provider transfers the language command into a text string and returns the text string as a preprocessed user request to the electronic device.

Optionally, the electronic device service provider may forward the preprocessed user request to a user device service provider either directly or via the electronic device. In this way, at least one keyword can be extracted from the user request. Based on the extracted keyword the at least one information content is selected from a content database. The content database may be hosted by at least one of the electronic device service provider and the user device service provider. Since the content database is rather specific with regards to information of the user device it may be typically hosted by the user device service provider.

The selection of the at least one information content from the content database may be provided by the user device service provider when receiving a respective keyword or keyword request from the electronic device. With some further examples, selection of the at least one information content from the content database is performed and conducted by the electronic device itself. The at least one selected information content is finally provided to the user by the user interface of the electronic device. Providing of at least one or several selected information contents to the user may include providing of a content selection after including at least a first information content identifier and a second information content identifier, wherein first and second information content identifiers being indicative of respective first and second information contents, respectively.

According to a further aspect the present disclosure further relates to a non-transitory computer readable storage medium storing one or more programs. The one or more programs comprise instructions, which when executed by a processor of an electronic device cause the device to receive a user request, to process and/or to preprocess the user request, to extract at least one keyword from the user request or from the preprocessed user request, to select at least one information content from a content database on the basis of the at least one extracted keyword and to provide at least one selected information content to the user by a user interface of the electronic device.

The one or more programs may be executed in or by a processor of the electronic device as described above. The one or more programs may be concurrently executed by a processor of at least one of the electronic device service provider and the user device service provider. There may be provided numerous computer programs distributed on the electronic device and at least one of the electronic device service provider and the user device service provider. Respective server and client programs may be provided being configured to adequately process the user request and to provide at least one information content from a content database in response to the user request.

Typically, the non-transitory computer readable storage medium storing one or more programs is or are configured to implement the above described method of providing information to a user as described above, typically by making use of an information system for providing information to a user as described above and/or by making use of an electronic device for providing an information to a user as described above.

Insofar, all features, aspects, benefits and properties of the electronic device, of the information system, and of the method of providing information as described above equally apply to the computer readable storage medium and the one or more programs stored there on.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codeable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g. a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide. Examples of insulin analogues are Gly(A21), Arg(B31), Arg(B32) human insulin (insulin glargine); Lys(B3), Glu(B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N—(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C (Efpeglenatide), HM-15211, CM-3, GLP-1 Eligen, ORMD-0901, NN-9423, NN-9709, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, ZP-DI-70, TT-401 (Pegapamodtide), BHM-034. MOD-6030, CAM-2036, DA-15864, ARI-2651, ARI-2255, Tirzepatide (LY3298176), Bamadutide (SAR425899), Exenatide-XTEN and Glucagon-Xten.

An example of an oligonucleotide is, for example: mipomersen sodium (Kynamro®), a cholesterol-reducing antisense therapeutic for the treatment of familial hypercholesterolemia or RGO12 for the treatment of Alport syndrom.

Examples of DPP4 inhibitors are Linagliptin, Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present invention include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, nanobodies, small modular immunopharmaceuticals (SMIP), binding-domain immunoglobulin fusion proteins, camelized antibodies, and VHH containing antibodies. Additional examples of antigen-binding antibody fragments are known in the art.

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present invention, which encompass such modifications and any and all equivalents thereof.

BRIEF DESCRIPTION OF THE DRAWINGS

In the following, examples of an information system, an electronic device and a method of providing information to a user of are described in greater detail by making reference to the drawings, in which:

FIG. 8 shows another example of a user request and a respective content selection offer in combination with a selected information content and FIG. 9 is indicative of a flowchart of a method of providing information to a user.

DETAILED DESCRIPTION

Figure 1:
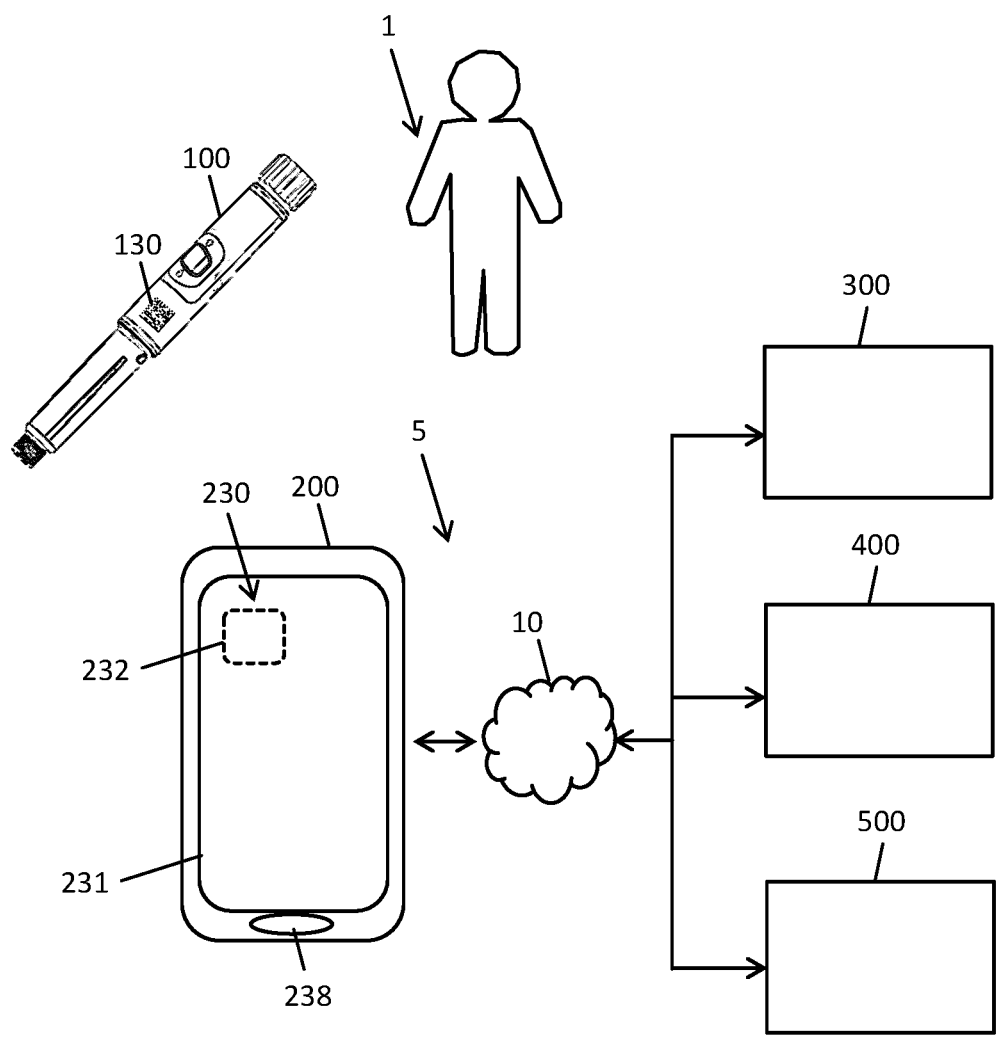
FIG. 1 is indicative of a block diagram of an example of an information system for providing information to a user.

The block diagram of FIG. 1 is indicative of one example of an information system 5 for providing information to a user 1 with regards to a user device 100. In the present example the user device 100 is a medical device. It may be implemented as a hand held medical device. The user device may comprise a drug delivery device, such as an injection device, an inhaler or an infusion device. In the presently illustrated example the user device 100 is provided with an identifier 130. Here, the identifier 130 is provided on an outside facing portion of a housing of 101 of the personal device 100. The identifier 130 may comprise a visual or optical code that can be scanned or read by a user interface 230 of an electronic device 200.

With other examples the identifier 130 may be a code readable by the user 1 himself. Then, the user 1 may be obliged to enter the identifier 130, i.e. the readable code into the electronic device 200. The user 1 typically has access to the electronic device 200. The electronic device 200 may be implemented as a portable or wearable electronic device. The electronic device 200 may comprise a smart phone, a smart watch or some other type of wearable electronic device. With some examples the electronic device 200 comprises a tablet computer or a portable computer, such as a laptop computer.

The electronic device comprises a user interface 230. The user interface 213 may include at least one of a display 231, a camera 232, a speaker 234, a microphone 236 and at least one key or button 238. The display 231 may comprise a two-dimensional screen. The display 231 may be implemented as a touch sensitive display. The display 231 may provide emulated or virtual keyboard on demand thus offering the possibility to enter numbers, signs or text into the user interface 230.

Figure 2:
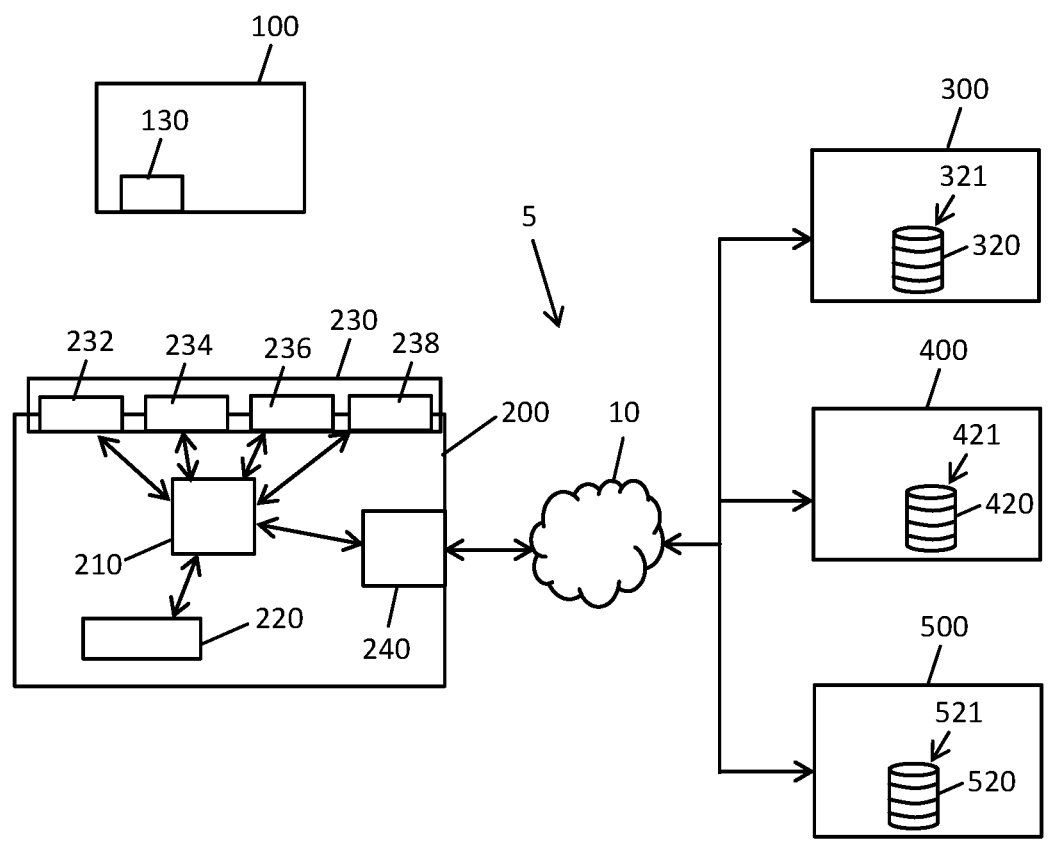
FIG. 2 is indicative of a portion of the block diagram according to FIG. 1 illustrating the electronic device in more detail.
Figure 3:
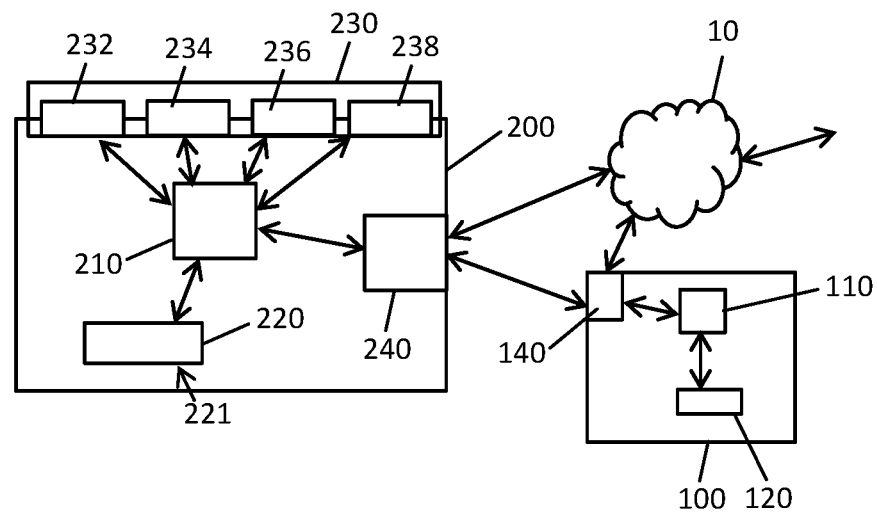
FIG. 3 is indicative of a block diagram illustrating an example of an interface between the electronic device and the user device.

The internal structure of the electronic device 200 is described in more detail with regards to FIGS. 2 and 3. The electronic device 200 comprises a processor 210 connected to the user interface 230. The electronic device 200 further comprises a storage 220, implemented as an electronic storage 220. The electronic storage 220 is connected to the processor 210. The electronic device 200 further comprises a communication interface 240. The communication interface 240 may be implemented as a wired or wireless communication interface, e.g. connectable to a local area network (LAN). With some examples the communication interface 240 is implemented as a wireless communication interface. It may be implemented as a Wi-Fi-based communication interface. It may operate in a radio frequency range.

The communication interface 240 may operate in at least one of widely used and common wireless communication standards, such as Wi-Fi, IEEE 802.11, Bluetooth, GSM, LTE or others.

The electronic device 200 is configured to communicate via a communication network 10 with at least one of a user device service provider 300, an electronic device service provider 400 and a content provider 500. Each one of these providers 300, 400, 500 typically comprises at least a processor 310, 410, 510 and at least one electronic storage 320, 420, 520, respectively. The electronic storage 320 is typically provided with a user device-specific content database 321. The electronic storage 420 is provided with an electronic device-specific content database. The storage 520 of the third party content provider 500 is provided with another content database.

The service or content providers 300, 400, 500 may mutually communicate via the communication network 10. The communication network 10 may be provided by the Internet, by a mobile phone network, by a local area network or by some other type of electronic communication network.

In the example of FIGS. 1 and 2 the personal device 100 is a standalone medical device. It is void of an electronically implemented user interface. The identifier 130 is provided on an outside surface of the housing 101. The identifier 130 may be provided as a visual or graphical code. The identifier 130 may be scanned by a camera 232 of the user interface 230 of the electronic device 200. In this way, basic information regarding the user device 100 is automatically captured by and/or provided to the electronic device 200. Alternatively, a user 1 may enter a unique identifier 130 of the user device 100 into the user interface 230.

The electronic device 200 is particularly configured to embed the identifier 130 of the user device 100 in a user request 261. The identifier 130 is either manually provided to the electronic device 200 or it is automatically captured, e.g. by the camera 232 of the user interface 230. A user request 261 typically contains or includes the identifier 130 of the related user device 100. When a user request 261 is received by one of the user device service provider 300 or electronic device service provider 400 the identifier 130 is extracted from the user request 261 so that the user device service provider 300 and/or the electronic device service provider 400 provide information being related to the identified user device 100.

When the user demands particular information regarding the user device 100 he may enter a respective user request 261 into the electronic device 200. Entering of a user request 261 can be conducted in numerous different ways. For instance, the user 1 may type a text string in the touch sensitive display 231. The processor 210 may be configured to process the user request 261 either standalone or by way of communicating with at least one of the electronic device service provider 400 and the user device service provider 300. The processor 210 is configured to extract at least one keyword from a user request and to select at least one information content from a content database 221 of the local electronic storage 220 of the electronic device 200 or from any other of the content databases 321, 421, 521 as provided by the user device service provider 300, the electronic device service provider 400 or by the content provider 500.

Precise extraction of at least one keyword and/or the semantic and correct interpretation of the user request is quite demanding for the processor 210 and may exceed the computational capabilities and/or storage capabilities of the portable electronic device 200. In particular, the processor 210 of the electronic device 200 may be operable to execute a virtual assistant 270 for processing of the user request. Operating or executing of the virtual assistant may include or may comprise communication with at least one of the user device service provider 300 and the electronic device service provider 400.

Processing of the user request includes the identifier 130 of the user device 100. Hence, the user request in view of the user device always takes into account the user specific demand in view of the particular user device as previously identified through the device specific identifier 130.

In the further example of FIG. 3, the user device 100 is equipped with an electronic communication interface 140. It may communicate with the communication interface 240 of the electronic device 200. In addition, the user device 100 comprises a processor 110 and an electronic storage 120 connected to the processor 110. Here and in contrast to the example as illustrated in FIGS. 1 and 2, the identifier 130 of the user device 100 may be provided by the electronic storage 120. It may comprise a numeric or alphanumeric code stored in the electronic storage 120. Through a communication link between the communication interface 140 and the communication interface 240 the user device 100 can be identified by the electronic device 200.

There may be a direct communication link between the electronic device 200 and the user device 100. In addition or alternatively there may be provided an indirect communication link between the electronic device 200 and the user device 100, e.g. via the communication network 10. The user device 100 may individually communicate with at least one of the user device service provider 300 and the electronic device service provider 400.

Figure 4:
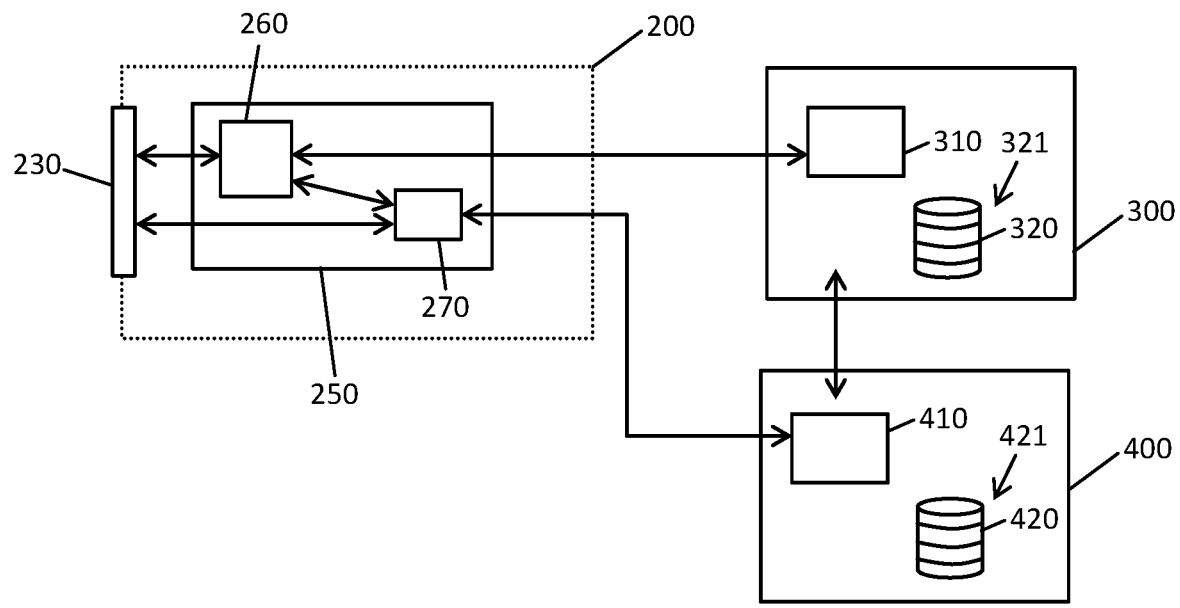
FIG. 4 shows another block diagram showing the interaction between the electronic device, the electronic device service provider and the user device service provider.

In FIG. 4 various logic units of the electronic device are schematically illustrated. The electronic device 200 comprises the user interface 230. The electronic device 200 further comprises an operating system 250. The operating system 250 is implemented as a software. The electronic device 200 further comprises a virtual assistant application 270 as well as a software application 260. The software application 260 can be implemented as a user device-specific software application 260. The software application 260 may be particularly dedicated and configured to provide information to the user 1 with regard to the user device 100. The software application 260 is configured to communicate with the user device service provider 300.

When the user device 100 is implemented as a medical device, e.g. as a drug delivery device, the user device service provider 300 may be provided by a pharmaceutical manufacturer or by a manufacturer of the user device 100. Typically, the communication between the electronic device 200 and the user device service provider 300 is provided via the communication network 10. Of course, the user device service provider 300 comprises a communication interface to communicate with the electronic device 200, e.g. via the communication interface 240 of the electronic device 200. As indicated in FIG. 4 the user device service provider 300 comprises a processor 310 connected to an electronic storage 320. Insofar the user device service provider 300 may host the content database 321 containing information about the user device 100.

The virtual assistant application 270 is configured to communicate with the electronic device service provider 400. Communication between the electronic device 200 and the electronic device service provider 400 is also provided via the communication network 10. The electronic device service provider 400 comprises a processor 410 and an electronic storage 420. The electronic storage 420 hosts a content database 421. The virtual assistant application 270 may be configured to interpret or to translate a natural language command as recorded and captured by the user interface 230.

As indicated in FIG. 4, the user interface 230 is connected or connectable to both, the software application 260 and to the virtual assistant application 270.

With some examples the electronic device 200 is configured to communicate with both, the user device service provider 300 and the electronic device service provider 400 separately and independently. However, with some examples it is conceivable, that the user device service provider 300 and the electronic device service provider 400 communicate directly with each other, e.g. via the communication network 10. Hence, a user request e.g. entered via the user interface 230 as initially processed via the virtual assistant application 270 may be transmitted and forwarded to the electronic device service provider 400. Then, a preprocessed user request as provided by the electronic device service provider 400 may be returned to the electronic device 200. Based on the initial user request and/or based on the preprocessed user request as returned from the electronic device service provider 400 the electronic device 200 may communicate further with the user device service provider, e.g. in order to extract at least one keyword from the user request, to select at least one information content from a content database 321 and/or to provide the at least one selected information content to the user via the user interface 230.

With some other examples it is conceivable, that an initial user request is processed or preprocessed by the electronic device service provider 400 and that the preprocessed user request is forwarded or transmitted directly to the user device service provider 300. When receiving the preprocessed user request from the electronic device service provider 400, the user device service provider 300 may provide functions, such as extracting at least one keyword from the user request or preprocessed user request, to select at least one information content from the content database 321 on the basis of the at least one extracted keyword and/or providing the at least one selected information content to the user via the communication interface.

Finally, the electronic device 200 is provided with a selected information content and is further configured to provide the selected information content 380 to the user 1 via the user interface 230.

With some examples an initial user request 260 is recorded or captured by the user interface 230. The user request 261 is transmitted to the electronic device service provider 400 via the virtual assistant application 270. A preprocessed user request 262 as provided by the electronic device service provider 400 may then be returned to the electronic device 200. The preprocessed user request 262 may then be forwarded or transmitted to the user device-specific software application 260. Then, the software application 260 and hence the processor 210 of the electronic device 200 may be configured to extract at least one keyword from the user request 261 and/or from the returned preprocessed user request 262.

For the purpose of extracting the at least one keyword from the user request 261 and/or the preprocessed user request 262 the software application 260 may communicate with the user device service provider 300. Additionally or alternatively, the electronic device 200 may provide a keyword extraction only on the basis of the user request 261 and/or on basis of the preprocessed user request 262 as returned by the electronic device service provider 400.

Once an information content has been selected from a content database 321, 421 on the basis of the at least one extracted keyword the respective information may be downloaded from the content database 321 by the communication network 10 to the electronic device 200.

With some further examples an initial user request 261 may be processed or preprocessed by the user device specific software application 260. Then and for the extraction of the at least one keyword from the user request 261, the software application 260 may be configured to trigger the virtual assistant application 270 concurrently with submission of the user request 261 to the user device service provider 300. Here, both the user device service provider 300 and the electronic device service provider 400 may provide a preprocessing of the user request 261 concurrently. Preprocessed user requests 262 as provided by the user device service provider 300 and as provided by the electronic device service provider 400 may then return to the electronic device 200.

From both preprocessed user requests 262 the software application 260 and/or the virtual assistant application 270 will be configured to extract the at least one keyword, to select at least one information content from a content database on the basis of the at least one extracted keyword and to provide the at least one selected information content to the user via the user interface 230.

Figure 5:
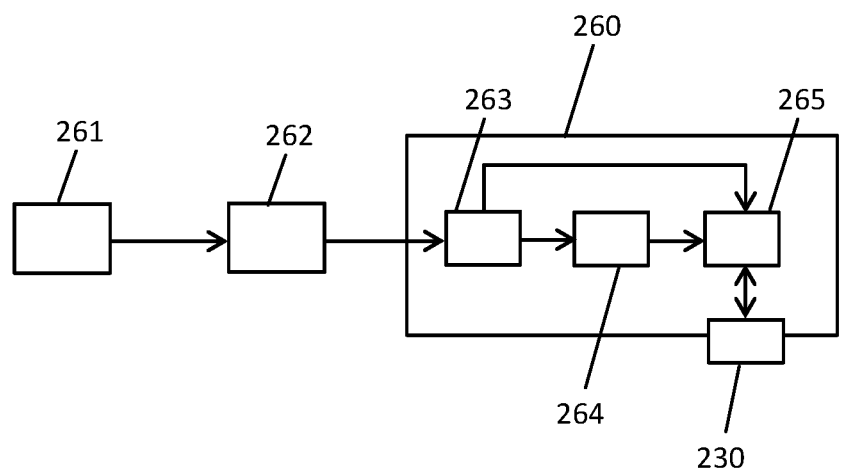
FIG. 5 is indicative of a block diagram illustrating the way of processing of a user request.

The block diagram of FIG. 5 is indicative of numerous logical units of the information system 5 and/or of the electronic device 200. As described above, an initial user request 261, e.g. provided as a language command is typically preprocessed by at least one of the software application 260 and the virtual assistant application 270. Typically and with the example of FIG. 5, a preprocessed user request 262, e.g. a language command translated into a text string, is provided to the software application 260. The software application 260 may comprise or provide at least one of a keyword extractor 263, a signal translator 264 and a content selector 265. The content as selected by the content selector 265 is then finally provided to the user interface 230 in order to display what and/or to provide the selected information to the user.

The numerous logical units, namely the keyword extractor 263, the synonym translator 264 and/or the content selector 265 may operate either standalone or may communicate with the user device service provider 300.

Typically, the keyword extractor 263 comprises a list of keywords commonly used in connection with the user device 100. The keyword extractor 263 may exploit a local content database 221 hosted by the local electronic storage 220 of the electronic device 200. The content database 221 and/or the keyword extractor 263 provide typical and rather user device-specific words, text strings or other kinds of information being rather specific for the user device 100. The keyword extractor 263 is typically configured to scan a text string as returned from the virtual assistant application 270. The keyword extractor 263 is particularly configured to identify individual words or strings in a preprocessed text string, e.g. derived from a language command by the virtual assistant application 270.

In order to provide a high degree of robustness, in particular in view of expressions used by the user 1 that do not exactly match with keywords as stored in the content database 221 the synonym translator 264 provides a translation of terms and synonyms, typically used by users of the use device 100 instead of correct technical terms or definitions commonly used by the manufacturer or provider of the user device 100. This is of particular use, when the user 1 is not using the correct technical terms or proper definitions, features or properties of the user device 100.

Insofar, the synonym translator 264 may be configured to replace a text string or a word as recognized in a preprocessed user request 262 by the correct and hence appropriate term of the user device 100. Based on this synonym translation the content selector 265 is then configured to select the originally intended and correct information content.

The features and functions of the keyword extractor 263, the synonym translator 264 and the content selector 265 are described in more detail with reference to FIGS. 6-8. For instance in FIG. 6 three different keyword groups 350, 360, 370 are indicated. Each keyword group 350, 360, 370 comprises a keyword group title 351, 361, 371. The presently illustrated example of keyword groups 350, 360, 370 relates to a user device 100 implemented as a drug delivery device, such as an injection pen.

The keyword group 350 with the keyword group title 351 "needle" comprises a keyword list 352 comprising numerous keywords 353, 354. As indicated in FIG. 6, the keyword list 351 comprises keywords such as "syringe" 353 or "tip" 354. The keywords 353, 354 of the keyword list 352 may be used as synonyms for the keyword group title 351. Hence, a user using the word "syringe" 353 in connection with a pen injector 100 typically means a needle or a tipped end of the injector.

Likewise, the keyword groups 360 with the keyword group title 361 may contain a keyword list 362 comprising expressions such as a "container", "vial", "reservoir", "barrel", "bottle", "carpule", "pouch" and so on. Furthermore, the keyword group 370 with the keyword group title 371 "assembly" relates to numerous aspects and actions related to the assembly or use of the user device 100. Here, the keyword list 372 comprises expressions such as "fixing", "mounting", "attaching", "screwing", "clipping", and so on that relate to the keyword group title 371 "assembly".

By way of grouping together numerous keywords 353, 354, 373 in keyword lists 352, 362, 372 and by assigning a keyword group title 351, 361, 371 to each keyword list 352, 362, 372 a synonym translation can be provided.

Figure 7:
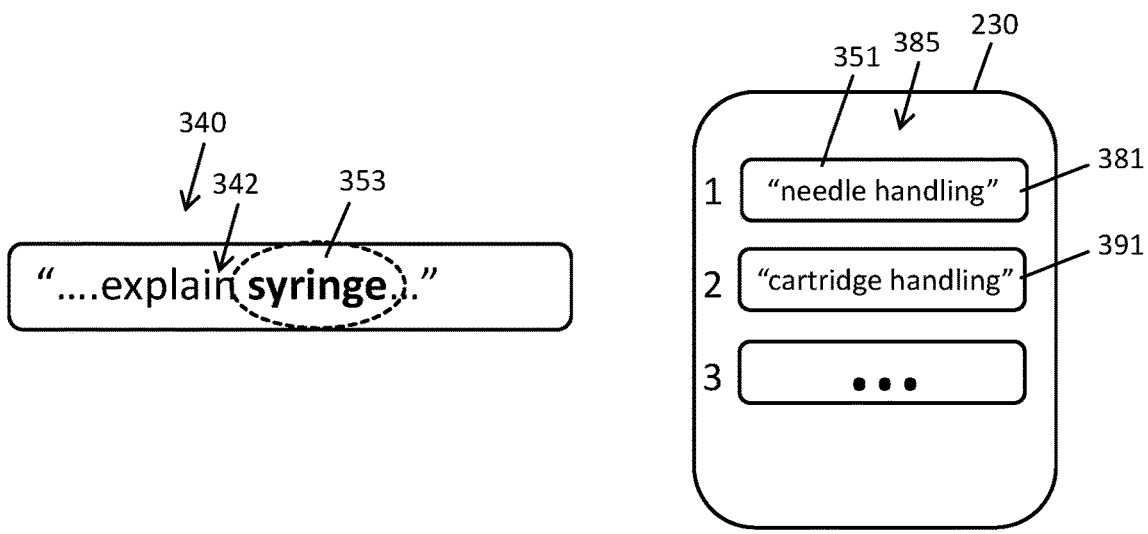
FIG. 7 is indicative of one example of a user request at an associated content selection offer.

As indicated in FIG. 7 a language command 340 containing the expression " . . . explain syringe" contains the keyword "syringe" 353. When processed by the software application 260 and/or by the virtual assistant application 270 the expression "syringe" is detected by respective text string analysis or word recognition. The processor 210 and/or the software application 260 is or are operable to identify the keyword 353 in the keyword list 352. Since the term "syringe" 353 is commonly used as a synonym for a needle of a user device 100 implemented as a pen-type injector the identified or recognized term syringe 353 is assigned with the respective keyword group title 351 "needle".

However, the term syringe may be also used as a synonym for a cartridge. Insofar, there might be also a certain likelihood, that the user originally meant to receive information with regards to the cartridge typically used with the drug delivery device or a pen injector 100.

Figure 6:
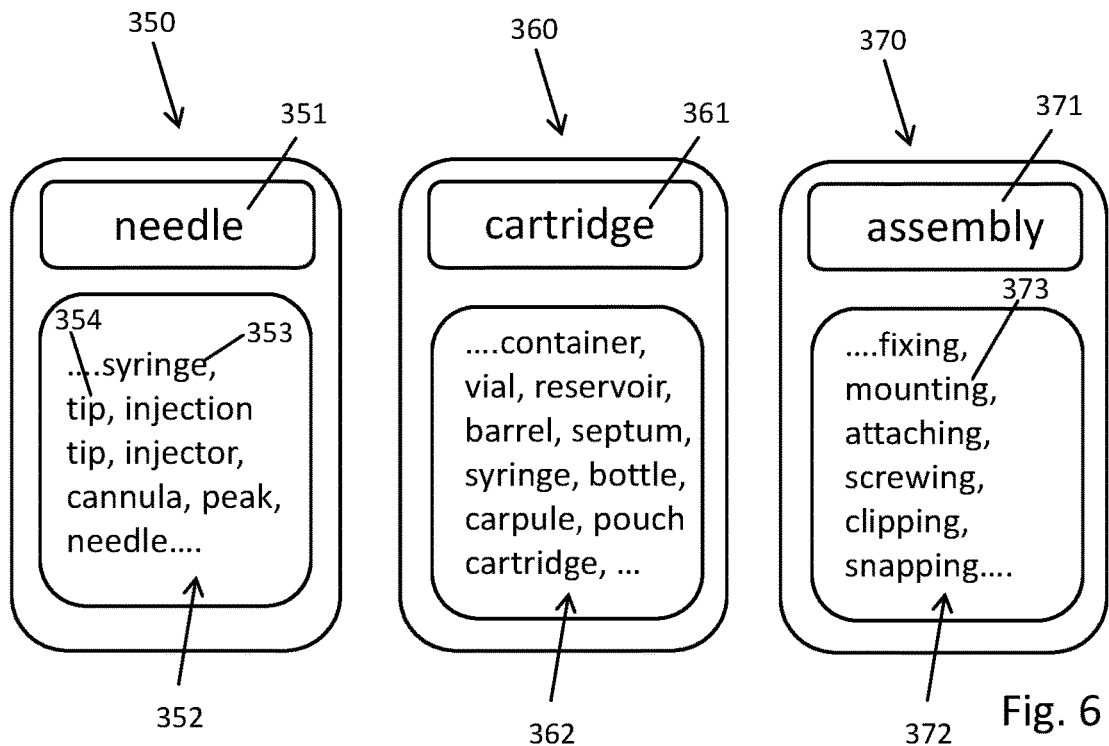
FIG. 6 is illustrative of numerous keyword groups as they might be provided in a content database.

In order to avoid providing non-selected or non-intended information to the user 1, the electronic device 200, the software application 260 and/or of the virtual assistant application 270 is or are configured to provide a content selection offer 385 to the user via the communication interface 230 as illustrated in FIG. 6. Depending on a general likelihood of previous synonym translations the electronic device 200 provides at least two different information content identifiers 381, 391.

The first information content identifier 381 is based on a synonym translation that the recognized term "syringe" should be translated as "needle". The second information content identifier 391 is based on the assumption that the recognized keyword or term 353 "syringe" is a synonym for a "cartridge". Typically, the content selection offer 385 is communicated visually and/or audibly to the user 1 via the communication interface 230. The user 1 may then specify and/or select at least one of the first information content identifier 381 and the second content identifier 391.

The selection may be conducted by way of a further language command. Here, each one of the first and second information content identifiers 381, 391 may be provided with a unique identifier, such as a number. The user may that simply indicate the respective number to make a respective selection is indicated by the first and second information content identifiers 381, 391, respectively. In FIG. 8, the information content 380 related to the first information content identifier 381 and dedicated to the needle assembly is schematically illustrated. The information content 380 may contain text information, numerous pictures or even video streams. The information content 380 may be hosted and provided in or by the content database 321 of the user device service provider 300 and/or by the content database 521 of an external content provider 500.

The content provider 500 may be implemented as a platform on which numerous subscribers may deposit or upload arbitrary information contents. In order to save storage space the user device service provider 300 may simply provide a URL or a respective link to content information originally hosted by the third-party content provider 500 and accessible for the electronic device 200 via the communication network 10.

In the example of FIG. 7, the content selection offer 385 is based on the recognition of only one keyword 353 that may be translated in at least two different ways. In the example of FIG. 8, the language command 340 contains at least two recognized keywords 374, 354. The keyword 374 is indicative of an action, namely "mounting" and the further keyword 354 is indicative of an object, e.g. a "tip" of the injection device 100. As illustrated by the content selection offer 385 of FIG. 8 the electronic device 200 is configured to translate both keywords 374, 354 into the respective keyword group title 371, 351.

E.g., the keyword 354 "tip" is translated or substituted by the keyword group title 351 "needle". The further keyword 374 "mounting" is assigned or replaced by the respective keyword group title 371 "assembly". The two assigned or translated keywords are recombined and provide a first information content identifier 381 and a second information content identifier 391. Even though not illustrated, the keyword 374 may be also contained in another keyword list, related to the disassembly of the user device 100. Insofar, the information content identifier 381 may be indicative of the process of needle assembly and the further information content identifier 391 may be indicative of the process of needle disassembly.

Both, the first and the second information content identifiers 381, 391 may be generated and provided with a certain probability depending on a statistic analysis of previously processed user requests 261.

In FIG. 9, there is illustrated a flowchart of one example of the method of providing information to the user 1, wherein the information is indicative of the user device 100. In a step 600 a user 1 enters a user request 261 into the electronic device 200 via the user interface 230. There are numerous ways to enter the user requests 261. It may be entered as a language command 340. Alternatively or additionally, the user request 261 may be entered through haptic interaction with a touch screen of the display 231.

In a subsequent step 602 the user request 261 is preprocessed. Preprocessing may be conducted with the help of the electronic device service provider 400 and with the help of a virtual assistant application 270. For the preprocessing step 602 the system 5 may provide a natural language processing or natural language recognition. The preprocessing in step 602 provides a machine interpreted user request. When the original user requests 261 is provided as a natural language command 340, the preprocessed user requests 262 is provided or returned as a text string in step 602.

In the subsequent step 604 at least one or numerous keywords are extracted from the preprocessed user request 262. Thereafter and based on the keyword extraction a content selection is provided in step 608. As an intermediate step and if the extracted keyword in step 604 does not match with any of the keyword group titles 351, 361, 371 the method may continue with step 606. In this step the extracted or recognized keyword of step 604 is assigned with a keyword group title 351, 361, 371.

Then, in the proceeding step 608 the content selection is conducted on the basis of the keyword group title 351, 361, 371. For the content selection to be conducted in step 608 there may be numerous options or possibilities. In order to provide a user-controlled final selection of the information content in step 610 a content selection offer 385 is provided to the user 1, typically via the user interface 230. In the subsequent step 612 the user 1 may freely select at least one of first and second information content identifiers 381, 391. Based on this selection the method may continue with step 614 and may provide the respective information content 380, 390 in accordance to the previously selected information content identifier 381, 391.

However, if the user does not make a respective selection or if the user demands a different type of content the method may also return to step 608. Then, a different content selection or a different content selection offer 385 may be provided to the user 1 via the user interface 230.

The loop of the steps 608, 610 and 612 may be conducted numerous times until the user 1 is satisfied with the provided content selection offer 385. Moreover, there might be provided numerous levels or categories and subcategories of a certain information content. By iteratively executing the steps 608, 610, 612 a more and more specific information content selection may be provided until a suitable content information is finally selected by and provided to the user 1 in step 614. Finally, and after providing the selected information content to the user 1 the method continues with step 616 which the user is asked to provide a user feedback.

Based on the user feedback of step 616 the method and/or the electronic device 200 may perform or conduct a feedback and optimization routine in order to optimize the information system 5. Insofar, the information system 5 is equipped and provided with a self-learning algorithm or with an artificial intelligence configured as a deep learning routine. In this way each interaction with the user can be evaluated and can be used for future processing of user requests.

With some examples it is of advantage when at least one or several of the steps 600, 602, 604, 606, 608, 610 or 612 being provided or being at least assisted by at least one of the user device service provider 300 and the electronic device service provider 400. In this way, user feedback of a large group of users or making use of the user device service provider 300 and the electronic device service provider 400 can be used to improve the precision and the operability of the information system 5. Moreover, any information update with regard to the user device 100 can be made available to a large group of users having access to the respective content databases 321, 421, 521, e.g. via the electronic device 200.

REFERENCE NUMBERS

1 user
5 information system
10 communication network
100 user device
101 housing
110 processor
120 storage
130 identifier
140 communication interface
200 electronic device
210 processor
220 storage
221 content database
230 user interface
231 display
232 camera
234 speaker
236 microphone
238 button
240 communication interface
250 operating system
260 software application
261 user request
262 preprocessed user request
263 keyword extractor
264 synonym translator
265 content selector
270 virtual assistant application
300 user device service provider
310 processor
320 storage
321 content database
340 language command
342 text string
350 keyword group
351 keyword group title
352 keyword list
353 keyword
354 keyword
360 keyword group
361 keyword group title
362 keyword list
370 keyword group
371 keyword group title
372 keyword list
373 keyword
380 information content
381 information content identifier
385 content selection offer
390 information content
391 information content identifier
400 electronic device service provider
410 processor
420 storage
421 content database
500 content provider
510 processor
520 storage
521 content database

The invention claimed is:

1. A portable or wearable electronic device for providing an information to a user being indicative of a user device, the electronic device comprising:
   a processor to process a user request,
   a user interface to communicate with the user,
   an electronic storage connected to the processor,
   wherein the processor is operable:
   to extract at least one keyword from the user request, to process an identifier of the user device, and to process the user request on the basis of the identifier,
   to select at least one information content from a content database on the basis of the at least one extracted keyword, and
   to provide the at least one selected information content to the user via the user interface.

2. The electronic device according to claim 1, wherein the processor is operable to execute a virtual assistant application for processing of the user request.

3. The electronic device according to claim 1, further comprising a communication interface, wherein the processor is operable to submit the user request to at least one of a user device service provider and an electronic device service provider via the communication interface and to receive a preprocessed user request in return.

4. The electronic device according to claim 3, wherein the processor is operable to assign the at least one extracted keyword from at least one of the user request and the preprocessed user request to a keyword group containing numerous keywords, and
   wherein the processor is operable to select the at least one information content on the basis of the keyword group assigned to the at least one extracted keyword.

5. The electronic device according to claim 4, wherein the processor is operable to assign at least a first extracted keyword to a first keyword group and to assign at least a second extracted keyword to a second keyword group, and
   wherein the processor is operable to select the at least one information content on the basis of the first keyword group and the second keyword group.

6. The electronic device according to claim 1, wherein the processor is operable to preselect at least a first information content and a second information content from the content database on the basis of the at least one extracted keyword and to provide a content selection offer to the user, the content selection offer containing a first information content identifier and a second information content identifier.

7. The electronic device according to claim 6, wherein the processor is configured to provide at least one of the first information content and the second information content in response to the user selecting one of the first information content identifier and the second information content identifier of the content selection offer via the user interface.

8. The electronic device according to claim 1, wherein the user interface comprises at least one of a display, a camera, a speaker, a microphone, and a key or button, or a combination thereof.

9. The electronic device according to claim 1, wherein the processor is operable to process the user request containing a language command and to extract the at least one keyword from the language command.

10. The electronic device according to claim 1, further comprising a code reader operable to identify at least one of a mechanical code, an electronic code, a magnetic code, and a visual code of the identifier of the user device.

11. The electronic device according to claim 1, wherein at least one of the electronic device and the processor is configured to embed the identifier of the user device into the user request.

12. An information system for providing information to a user being indicative of a user device, the system comprising:
- an electronic device comprising a processor, an electronic storage, a user interface, and a communication interface, wherein the processor is operable to process a user request received via the user interface,
- at least one of a user device service provider and an electronic device service provider configured to preprocess the user request received from the user interface and to return a preprocessed user request to the electronic device, and
- wherein at least one of the processor, the user device service provider and the electronic device service provider is operable:
  - to extract at least one keyword from at least one of the user request and the preprocessed user request, to process an identifier of the user device, and to process the user request on the basis of the identifier,
  - to select at least one information content from a content database on the basis of the at least one extracted keyword, and
  - to provide the at least one selected information content to the user via the user interface.

13. The information system according to claim 12, wherein the content database is hosted by the user device service provider and wherein the user device service provider is configured to transfer at least a portion of the content database to the electronic device in response to the user request.

14. The information system according to claim 12, wherein the electronic device service provider is operable to preprocess the user request containing a language command and to provide a preprocessed user request containing a text string corresponding to the language command.

15. A method of providing information to a user being indicative of a user device, the method comprising the steps of:
- receiving a user request by an electronic device,
- preprocessing of the user request by the electronic device, extracting at least one keyword from the user request or from the preprocessed user request,
- processing an identifier of the user device and processing the user request on the basis of the identifier,
- selecting at least one information content from a content database on the basis of the at least one extracted keyword, and
- providing the at least one selected information content to the user via a user interface of the electronic device.

16. A non-transitory computer readable storage medium storing one or more programs, the one or more programs comprising instructions, which when executed by a processor of an electronic device cause the device to:
- receive a user request,
- preprocess the user request, extract at least one keyword from the user request or from the preprocessed user request,
- process an identifier of the user device and process the user request on the basis of the identifier,
- select at least one information content from a content database on the basis of the at least one extracted keyword, and
- provide at least one selected information content to the user via a user interface of the electronic device.

17. The electronic device according to claim 1, wherein the processor is operable to assign the at least one extracted keyword from the user request to a keyword group containing numerous keywords, and
- wherein the processor is operable to select the at least one information content on the basis of the keyword group assigned to the extracted keyword.

* * * * *